(No Model.)
E. N. ATWOOD.
APPARATUS FOR RECOVERING SODA.
No. 418,264. Patented Dec. 31, 1889.
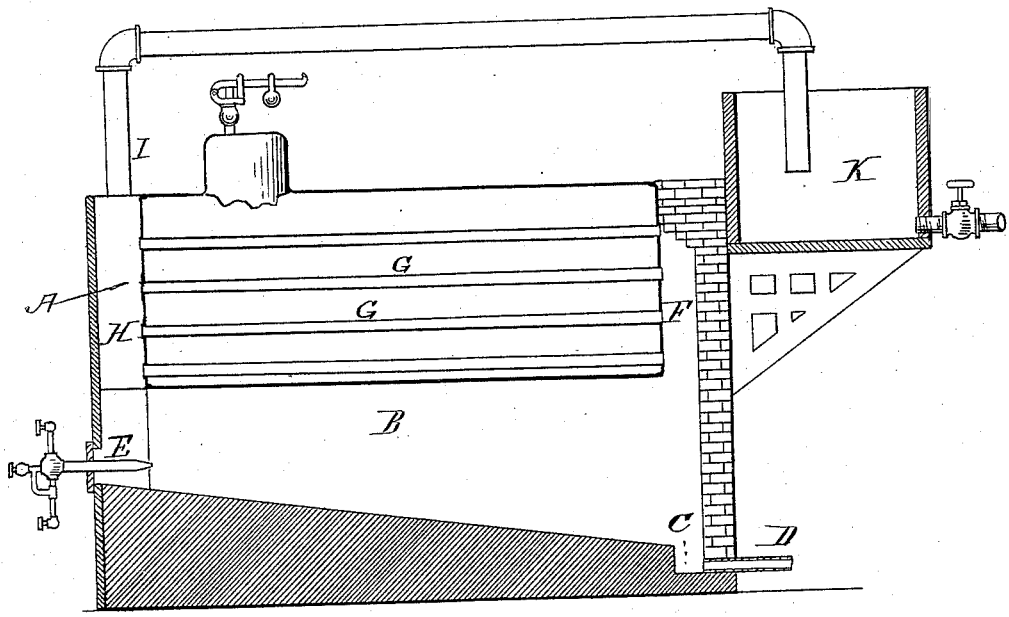
WITNESSES.
Frank G. Parker
Arthur D. Davis
INVENTOR.
Edward N. Atwood
by his attorney
Alex. L. Hayes

UNITED STATES PATENT OFFICE.

EDWARD N. ATWOOD, OF PORTLAND, MAINE, ASSIGNOR, BY MESNE ASSIGNMENTS, TO S. D. WARREN & CO., OF BOSTON, MASSACHUSETTS.

APPARATUS FOR RECOVERING SODA.

SPECIFICATION forming part of Letters Patent No. 418,264, dated December 31, 1889.

Application filed December 3, 1887. Serial No. 256,852. (No model.)

*To all whom it may concern:*

Be it known that I, EDWARD NORTON ATWOOD, a citizen of the United States, residing at Portland, in the county of Cumberland and State of Maine, have invented a new and useful improvement in apparatus for recovering chemicals from solutions or when mixed with other substances which are volatilizable or destructible by heat, and is especially adapted for recovering soda from the spent soda-liquor of paper-pulp mills, of which the following is a specification.

The solution of soda which is used in the treatment of wood pulp for the manufacture of paper contains, after having been used, such a quantity of resinous substance derived from the wood that it is capable of being burned, thus permitting the recovery of the soda contained therein, and various methods have been devised for this purpose.

The accompanying drawing is a vertical sectional view of this apparatus.

Referring to the drawing, A is the horizontal boiler, suitably mounted over the fire-box or combustion-chamber B, which is preferably tightly closed both at the front and rear ends, and which is provided, as herein shown, with a sloping floor, having a basin C at its end, provided with a discharge-pipe D.

E represents a burner or atomizer, which may be of any desired or usual construction, it being inserted preferably into the front of the combustion-chamber or fire-box B. In the rear of the combustion-chamber is a flue or passage F, which extends up in the rear of the boiler, and H is a passage or flue in front of the boiler, but separated from the combustion-chamber.

G G are tubular flues, which extend through the boiler and connect the passages F and H. From the passage H a pipe I is carried to a tank of water K, and the end of this pipe extends into the water, so that the products of combustion pass into the water and escape into the air through the same. This tank acts as a means for causing a back-pressure in the furnace and also to separate the floating particles of alkali from the gaseous products of combustion.

When the liquor is burned in the combustion chamber, the soda falls upon the inclined floor of the same, and can be collected in the basin C, from which it can be drawn off by the discharge-pipe.

Having thus described my invention, what I claim, and desire to secure by Letters Patent of the United States, is—

1. In a furnace for the recovery of chemicals, a combustion-chamber and an atomizer consisting of a liquid-inlet pipe connected to the supply of spent liquor to be recovered, and a steam-pipe connected to said inlet-pipe to discharge the spent liquor of pulp-digesters into said combustion-chamber, combined with a condenser or wash-tower connected to said furnace, whereby any chemical, as soda, carried off from the combustion-chamber may be recovered, substantially as described.

2. In a furnace for the recovery of chemicals, a combustion-chamber and an atomizer or burner communicating with the said chamber and connected to the supply for said chemicals, combined with a condenser or wash-tower connected to said furnace, to operate substantially as described.

E. N. ATWOOD.

Witnesses:
GEO. E. BIRD,
HERBERT H. D. PEIRCE.